United States Patent Office 2,898,158
Patented Aug. 4, 1959

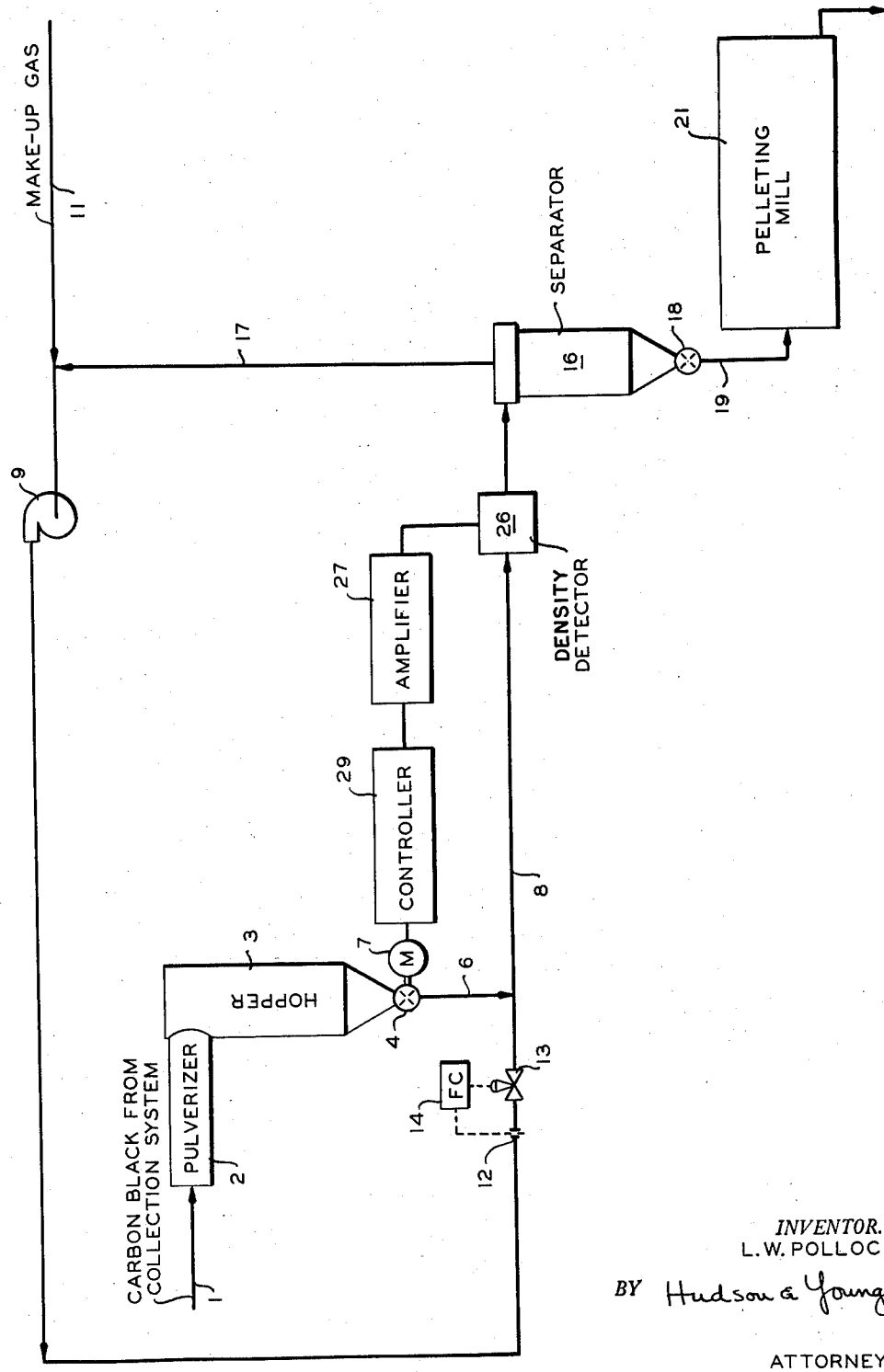

2,898,158

CONTROLLING MASS FLOW RATE OF PARTICULATE MATERIAL IN A PNEUMATIC SYSTEM

Lyle W. Pollock, Bartlesville, Okla., assignor to Phillips Petroleum Company, a corporation of Delaware Application July 27, 1956, Serial No. 600,609

4 Claims. (Cl. 302—53)

This invention relates to controlling the mass flow rate of particulate material suspended in the gaseous medium of a pneumatic system. In another aspect it relates to a method and apparatus for controlling the mass flow rate of a gaseous stream containing finely divided solids suspended therein. In a particular aspect, it relates to a method and apparatus for pneumatically conveying a gaseous stream containing finely divided carbon black suspended therein.

Although my invention is applicable wherever a pneumatic system is used for conveying finely divided or particulate solids where a constant mass flow rate is desired, it is particularly applicable to pneumatic systems conveying suspended carbon black in a gaseous stream and the following discussion will illustrate my invention as applied thereto. However, it is to be understood that it is not unduly limited thereto but can be used, for example, in pneumatic systems employed to convey diatomaceous earth at a constant mass flow rate to a fertilizer coating process, or, as another example, to control the mass flow rate of a pneumatic system conveying pulverized fuel, such as coal dust.

Accordingly, it is an object of my invention to control the mass flow rate of particulate material suspended in the gaseous medium of a pneumatic system. Another object is to provide an improved method and apparatus for conveying, at a controlled mass flow rate, a suspension of finely divided solids in a gaseous medium. A further object is to provide a simple, dependable, and an automatic method and apparatus for controlling the addition of finely divided carbon black to a gaseous medium such as air, so as to provide a pneumatic suspension of carbon black having a constant mass flow rate. Other objects and advantages of my invention will become apparent, to those skilled in the art, from the following discussion, appended claims, and accompanying drawing.

Broadly contemplated, I propose to control the addition of particulate material to a gaseous medium having a constant flow rate by measuring the density of the resulting suspension of the particulate material in the gaseous medium and concurrently controlling said addition so as to control the mass flow rate of said resulting suspension.

Referring now to the single drawing, a diagrammatic representation of a system is shown and my invention will be discussed by applying it to the pneumatic conveying of finely divided carbon black.

In the prior art of producing carbon black in furnaces, a hot gaseous effluent containing gas, water vapor, and suspended carbon black is produced. The carbon black is separated from the effluent in a series of steps by passing the effluent through a plurality of separation means, such as an electrical precipitator and one or more cyclone separators. It is customary to collect the carbon black in a surge tank, pass it through a pulverizer and then dispense or convey the same into pellet mills. These pellet mills agglomerate the carbon black dust into pellets which can be conveniently stored and shipped.

According to one embodiment of my invention, the finely divided carbon black from the separation or collection system is conveyed by line 1 to a pulverizer 2 which is in communication with a hopper 3 or similar device having at its outlet end sloping walls terminating in a valve 4, such as a conventional star valve. This star valve 4 is a device similar to a revolving door, each section of which takes a measured volume of the carbon black deposited as a powder in the bottom of the hopper, and in revolving, passes it to its respective outlet conduit, such as 6, generally by gravity. The star valve 4 is operated by a variable speed motor 7 or other power actuating device. For conveying the carbon black in the pneumatic conveying or feed line 8, from the carbon black outlet conduit 6, there is provided a blower 9 which is operatively connected to one end of the conveying line 8. The blower 9 is supplied by line 11 with a gaseous medium, such as air. The blower 9 may be operated so as to maintain a constant circulation of the gaseous medium in conveyor line 8. The term "pneumatic" as applied herein and in the appended claims designates any gas conveying medium such as air, nitrogen, process gases such as waste gases of the carbon black making process, and the like.

In order to control the gas flowing in the conveying line 8 at a constant flow rate, an orifice, Pitot tube or the like, designated 12, is provided in the conveying line 8 in conjunction with a motor valve 13 and flow controller 14. The flow controller 14 actuates the motor valve 13 in response to signals from the orifice 12.

The suspension of carbon black in the conveying line 8 is eventually passed to a device 16 capable of separating the carbon black from the conveying gases, such as a cyclone separator, centrifuge, bag filter, or the like. If desired, a plurality of these devices can be employed. The solids-free off-gas is returned to the supply line 11 by means of line 17. The separating device 16 can have sloping walls with its outlet terminating in a valve 18, which can also be a conventional star valve. A discharge line 19 conveys the carbon black from the valve 18 to a pelleting mill 21. Where my invention is applied to the coating of fertilizer with diatomaceous earth, or where it is applied to the conveying of a pulverized fuel, a tumbling mill, boiler or furnace can be substituted for the pelleting mill 21.

As mentioned hereinbefore, it is often desirable to control the mass flow rate of the solids suspension. Accordingly, by the practice of my invention, a density detecting or sensing device 26 is provided in the conveying line 8. This device 26 can be a photoelectric device, a differential pressure-detecting device, an alpha, beta or gamma ray source and detector, such as an Ohmart density meter, or any other device known in the art for measuring the density of a suspension of particulate material in a gaseous medium. In one modification of my invention, the density detecting device can be a source of light on one side of the conveying conduit 8, and a photoelectric cell on the other side of the conveying line 8 in the direct rays of a beam thrown by the light source. The signal generated by the density detecting device 26 is supplied to a conventional amplifier 27 (such as that supplied by the Ohmart Corp. and described in Bristol Co. Bulletin W1893.4–2, page 4, Sept. 1953) which amplifies the signal and feeds it to a controller 29 which controls the power means 7 used to operate the valve 4. The controller 29 is preferably a constant-voltage source for the field of a motor 7, which can be a D.-C. shunt wound motor. The varying D.-C. voltage output of amplifier 27 is impressed across the armature of motor 7. The speed of motor 7 will thus vary in direct proportion to the output signal from detector 26.

Thus, the density detecting device 26, in conjunction with the amplifier 27 and controller 29, is able to maintain the density of the stream of suspended carbon black in the conveying line 8 at a constant value by controlling the rate of addition of carbon black from the hopper 3 by the valve 4 to the gaseous medium circulating in line 8 at a constant flow rate. For example, the density of the suspended carbon black stream can be maintained at about 0.2 pound of carbon black per cubic foot of flowing gaseous medium.

Various modifications of my invention will become apparent, to those skilled in the art, without departing from the scope and spirit of my invention; and it is to be understood that the foregoing discussion and accompanying drawing are set forth for illustrative purposes only and do not unduly limit my invention.

I claim:

1. A method for controlling the mass flow rate of a suspension of particulate material in a gaseous medium, which comprises maintaining the flow rate of said medium at a constant value, introducing said particulate material into a single stream of said medium that comprises the total quantity of said medium that is flowing by allowing said particulate material to fall into said gaseous medium solely under the influence of gravity, the rate of said introduction of said particulate material being independent of flow rate of said gaseous medium, measuring the density of the resulting suspension of said particulate material by passing said suspension through a density measuring zone, and controlling the amount of said particulate material introduced in response to the resulting density measurement, thereby controlling the mass flow rate of said particulate suspension.

2. A method for controlling the mass flow rate of a suspension of particulate material in a gaseous circulating medium, which comprises maintaining the total flow rate of a single stream of said circulating medium at a constant value, introducing said particulate material into said single stream of said circulating medium by allowing said particulate material to fall into said single stream solely under the influence of gravity, the rate of said introduction of said particulate material being independent of the total flow rate of said single stream of said circulating medium, measuring the density of the resulting suspension of said particulate material by passing said suspension through a density measuring zone at a point downstream of said introduction, concurrently controlling the means whereby said introduction is effected in response to said density measurement, thereby maintaining the mass flow rate of said particulate suspension at a constant value, separating the particulate material from the particulate suspension, and recycling the resulting particulate-free gaseous circulating medium to a point where said particulate material is introduced.

3. In a pneumatic system, conduit means to convey a particulate material suspended in a gaseous circulating medium; means to supply said conduit with a single stream of said gaseous circulating medium; second means to control the total flow rate of said gaseous circulating medium in said conduit means; a source of particulate material; valve means to flow, solely under the influence of gravity, said particulate material from said source into said single stream at a point in said conduit downstream of said second means, said valve means being independent of the flow rate of said circulating medium; a power source to actuate said valve means; density measuring means downstream of said valve means; and control means responsive to said density measuring means for actuating said power source.

4. In a pnuematic system, conduit means to convey a particulate material suspended in all of a gaseous medium that is circulating, a blower in said conduit means to supply all of said gaseous medium to said conduit means, control means in said conduit means downstream of said blower to control the flow rate of all of said gaseous circulating medium in said conduit means, a source of particulate material, valve means to flow said particulate material solely under the influence of gravity from said source into said conduit means at a point downstream of said control means, said valve means being independent of the flow rate of the said circulating medium, a power source to actuate said valve means, a density measuring means in said conduit means downstream of said valve means for producing a signal proportional to the density of the particulate suspension in said conduit means, amplifying means operatively connected to said density measuring means and adapted to receive said signal and amplify the same, control means operatively connected to said amplifying means and adapted to receive the resulting amplified signal and concurrently control the actuation of said power source in proportion to said density, whereby the said addition of particulate material is controlled, and means to separate said particulate material from the resulting constant density particulate suspension.

References Cited in the file of this patent

UNITED STATES PATENTS

| | | |
|---|---|---|
| 2,554,583 | McFall | May 29, 1951 |
| 2,590,148 | Berg | Mar. 25, 1952 |
| 2,726,122 | Hagerbaumer | Dec. 6, 1955 |
| 2,765,265 | Bourguet | Oct. 2, 1956 |